(12) United States Patent
Arakawa

(10) Patent No.: US 6,812,983 B2
(45) Date of Patent: Nov. 2, 2004

(54) RETARDATION PLATE AND FABRICATION METHOD THEREOF, AND PLATE FOR CIRCULARLY POLARIZING LIGHT, ½ WAVE PLATE AND REFLECTION-TYPE LIQUID CRYSTAL DISPLAY DEVICE UTILIZING THE RETARDATION PLATE

(75) Inventor: Kohei Arakawa, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/858,947

(22) Filed: May 17, 2001

(65) Prior Publication Data

US 2002/0005925 A1 Jan. 17, 2002

(30) Foreign Application Priority Data

May 17, 2000 (JP) .................................... 2000-145107
Aug. 7, 2000 (JP) .................................... 2000-238439

(51) Int. Cl.[7] ............................................. G02F 1/1335
(52) U.S. Cl. ...................................................... 349/117
(58) Field of Search ........................... 349/117, 96, 119, 349/124

(56) References Cited

U.S. PATENT DOCUMENTS

| | | | | |
|---|---|---|---|---|
| 5,138,474 A | * | 8/1992 | Arakawa | .................... 349/120 |
| 5,543,948 A | * | 8/1996 | Takahashi et al. | ............. 359/73 |
| 5,818,559 A | * | 10/1998 | Yoshida | ....................... 349/122 |
| 6,124,971 A | * | 9/2000 | Ouderkirk et al. | ........... 359/487 |
| 6,168,851 B1 | * | 1/2001 | Kubota | ........................ 428/200 |
| 6,175,400 B1 | * | 1/2001 | Duncan et al. | .............. 349/117 |
| 6,362,862 B1 | * | 3/2002 | Itoh et al. | .................... 349/119 |
| 6,407,787 B1 | * | 6/2002 | Sekime et al. | ............... 349/119 |

FOREIGN PATENT DOCUMENTS

JP            04-121703     * 4/1992

* cited by examiner

Primary Examiner—Tarifur R. Chowdhury
Assistant Examiner—Thoi V. Duong
(74) Attorney, Agent, or Firm—Sughrue Mion, PLLC

(57) ABSTRACT

The present invention provides a broad band retardation plate that can be fabricated by a simple process and uniformly retards light incident of the entire visible light region. The retardation plate contains materials including positive or negative intrinsic double refraction values. When retardation values in wavelengths of 450 nm, 550 nm, and 650 nm are defined as Re(450), Re(550) and Re(650), respectively, the retardation plate satisfies the relational expression of Re(450)<Re(550)<Re(650). The retardation plate has a first layer comprising a positive material and a second layer comprising a negative material. The first layer and second layers have double refraction, and are laminated such that lag axes of the both layers are orthogonally crossed. It is preferable that the positive material is a norbornene based polymer and the like.

22 Claims, 6 Drawing Sheets

F I G. 1
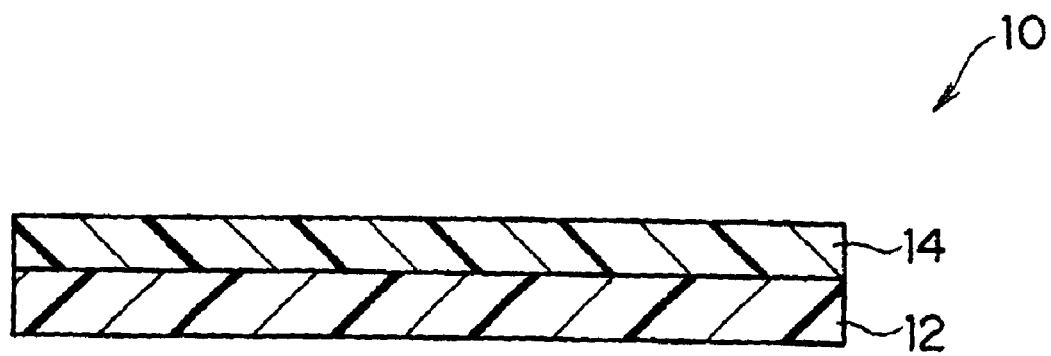

F I G. 5
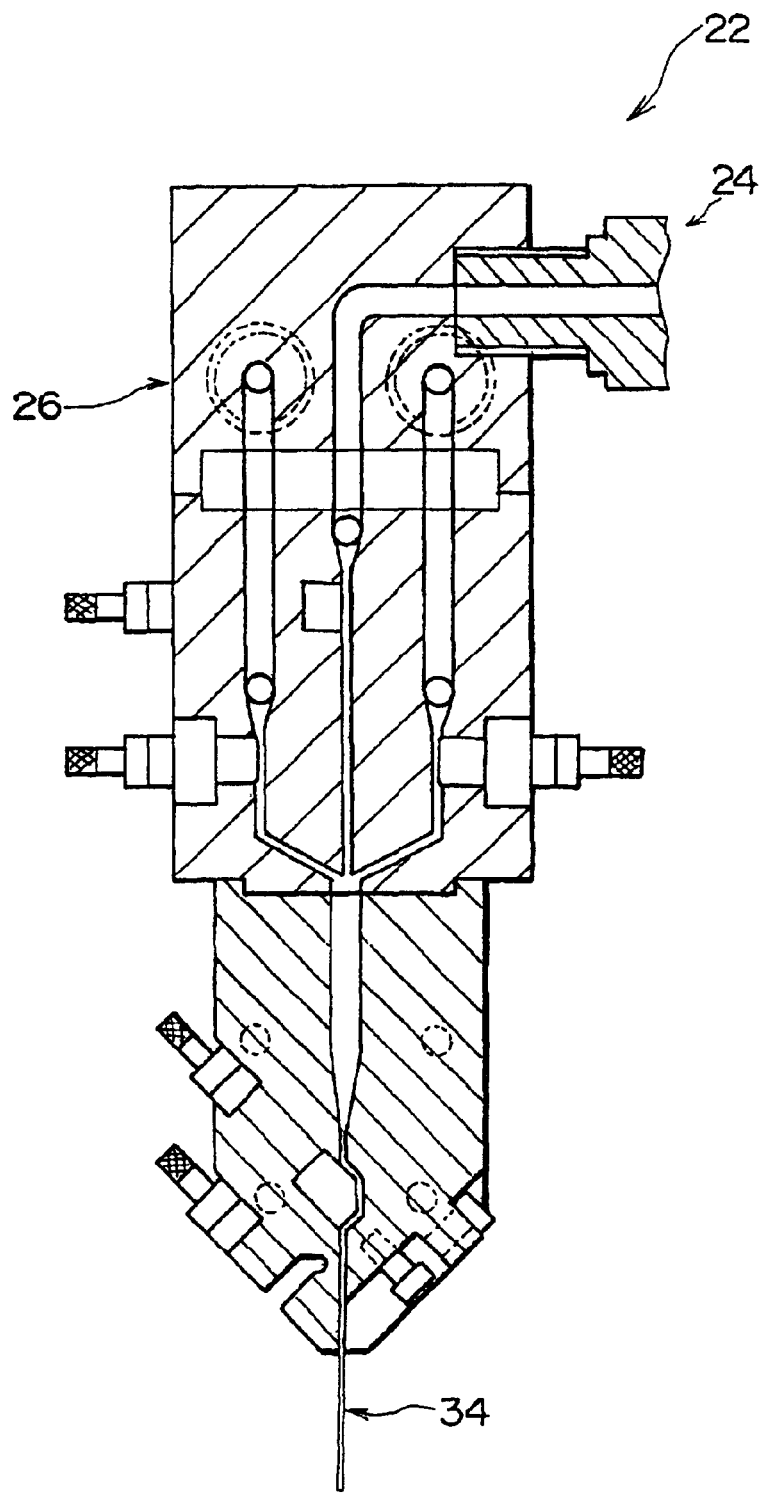

F I G. 6
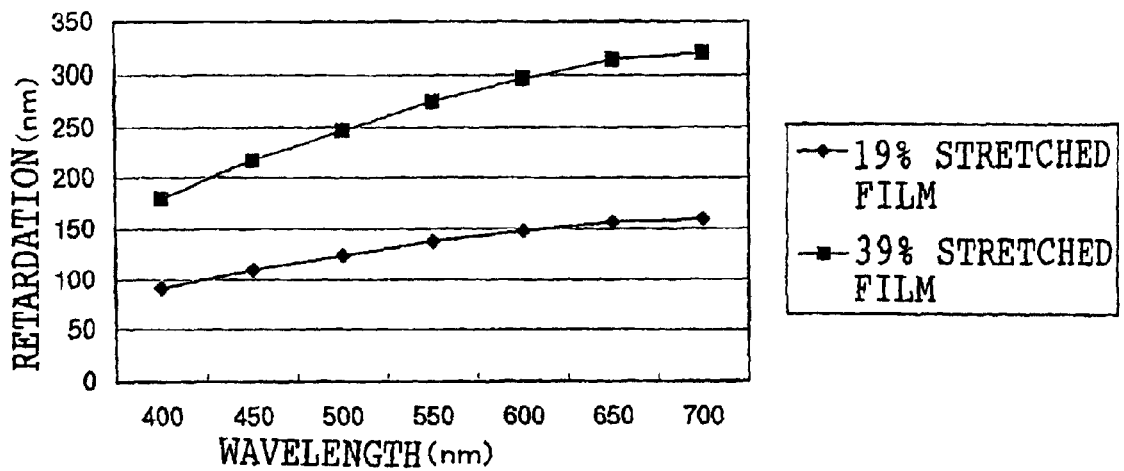
F I G. 7
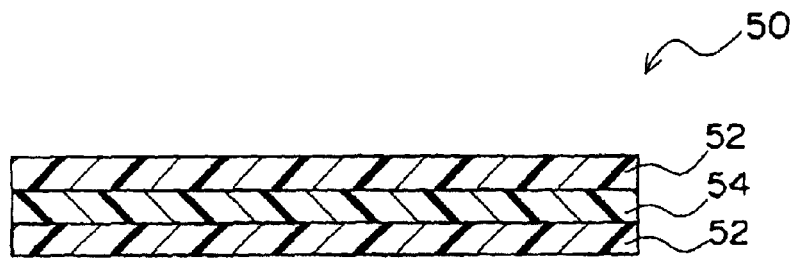

F I G. 8
WAVELENGTH DEPENDENCY OF RETARDATION (EXAMPLE 5)
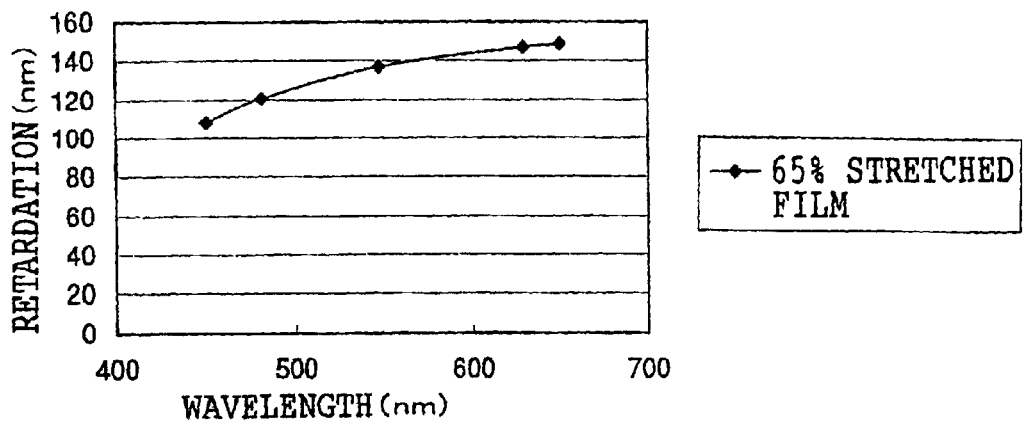
F I G. 9
WAVELENGTH DEPENDENCY OF RETARDATION
(COMPARATIVE EXAMPLES 7 AND 8)
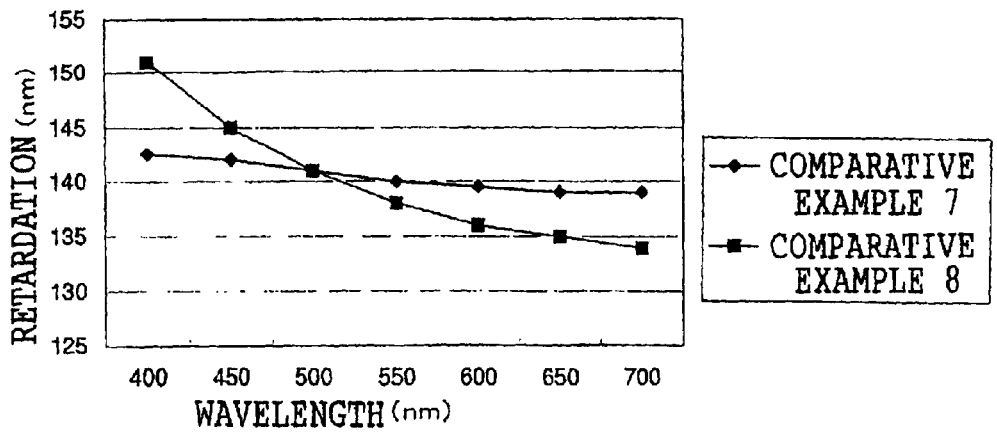

US 6,812,983 B2

RETARDATION PLATE AND FABRICATION METHOD THEREOF, AND PLATE FOR CIRCULARLY POLARIZING LIGHT, ½ WAVE PLATE AND REFLECTION-TYPE LIQUID CRYSTAL DISPLAY DEVICE UTILIZING THE RETARDATION PLATE

BACKGROUND OF THE INVENTION

1. Field of the Invention

The present invention relates to a retardation plate and a fabrication method thereof, and also relates to a plate for circularly polarizing light, a ½ wave plate and a reflection-type liquid crystal display device utilizing said retardation plate. More specifically, the invention relates to a retardation plate and a fabrication method thereof, and a plate for circularly polarizing light, a ½ wave plate and a reflection-type liquid crystal display device utilizing said retardation plate which can be used in display devices of personal computers, AV devices, portable information communication devices, game and simulation devices, and a navigation system for cars and the like.

2. Description of the Related Art

A ¼ wave plate whose retardation (Re) is ¼ of a wavelength has a variety of uses. For example, it may be used in a reflection-type liquid crystal display device, in a pickup for an optical disk, in a glare proof film and the like. A ½ wave plate whose Re is ½ of the wavelength also has a variety of uses. These include use in a liquid crystal projector and the like. In order for the ¼ wave plate and the ½ wave plate to be used for a variety of purposes, it is desired that the ½ wave plate and the ¼ wave plate can sufficiently carry out their respective functions for incident light within the entire visible light region. Examples of a broad band retardation plate which can function sufficiently for incident light within the entire visible light region include those disclosed in Japanese Patent Application Laid-Open No. 5-27118, JP-A Nos. 5-100114, 10-68816, 10-90521, in which two sheets of polymer films having anisotropies different from each other are laminated.

However, in order to fabricate a conventional laminated type retardation plate, it is necessary to form two kinds of chips in which stretched double refraction films are cut in a direction having different angles from each other with respect to the direction of stretching, and to adhere these chips with an adhesive agent and laminate them. Further, adhering the two sheets of chips results not only in the increased costs of coating an adhesive material onto the chips, and chipping and adhering them, but also results in reduced performance due to angle shifts and the like when the chips are adhered. These effects on the performance cannot be ignored. Moreover, in a laminated type retardation plate formed by adhesion of the chips, there may be a problem of reduced performance due to increased thickness.

SUMMARY OF THE INVENTION

The present invention has been carried out in consideration of the foregoing problems, and an object of the present invention is to provide a reflection-type liquid crystal display device with improved display luminosity by utilizing a broad band retardation plate capable of being manufactured by a simple method and uniformly retarding incident light in the entire visible light region, specifically a broad band $\lambda/2$ plate and a broad band plate for circularly polarizing light and the retardation plate. Moreover, another object of the present invention is to provide a method of fabricating a retardation plate in which a broad band retardation plate giving a uniform retardation to all of the incident lights can be fabricated by a simple process.

The present invention includes a retardation plate comprising a material including a positive intrinsic double refraction value and a material including a negative intrinsic double refraction value, with the materials resulting in retardation for wavelengths of electromagnetic radiation for the plate, and for wavelengths of 450 nm, 550 nm, and 650 nm, the plate retardation value for wavelengths of 450 nm is less than the plate retardation value for wavelengths of 550 nm, and the plate retardation value for wavelengths of 550 nm, is less than the plate retardation value for wavelengths of 650 nm.

The present invention also includes a retardation plate comprising a first layer which comprises a material including a positive intrinsic double refraction value and a second layer which comprises a material including a negative intrinsic double refraction value, wherein said first layer and said second layer each include lag axes, and are laminated to one another such that lag axes of said first layer and said second layer are substantially orthogonally crossed.

The present invention also includes a retardation plate, comprising a first layer which comprises a material including a positive intrinsic double refraction value and a second layer which comprises a material including a negative intrinsic double refraction value, wherein said first layer and said second layer each include molecular chains comprising an alignment direction substantially the same in both the first layer and the second layer.

The present invention also includes a ½ wave plate comprising a polarizing plate and a retardation plate laminated to the polarizing plate, the retardation plate comprising a material including a positive intrinsic double refraction value and a material including a negative intrinsic double refraction value, said retardation plate including retardation values for wavelengths of $\lambda$, defined as Re($\lambda$), and for each of $\lambda=450$ nm, $\lambda=550$ nm and Re($\lambda=450$)<Re($\lambda=550$)<Re($\lambda=650$), $0.4 \leq \text{Re}(\lambda)/\lambda \leq 0.6$, the polarizing plate including a polarizing plate transmission axis and said retardation plate including a lag axis, with said lag and transmission axis crossing each other.

The present invention also includes a ½ wave plate comprising a polarizing plate and a retardation plate laminated to the polarizing plate, the retardation plate including a first layer comprising a material including a positive intrinsic double refraction value, and a second layer comprising a material including a negative intrinsic double refraction value, said first layer and said second layer comprising double refraction, each layer including a lag axis with the layers laminated to one another with the lag axis of one layer substantially orthogonal to the lag axis of the other layer, said retardation plate comprising retardation values for wavelengths of $\lambda$, defined as Re($\lambda$), and for each of $\lambda=450$ nm, 550 nm and 650 nm, $0.4 \leq \text{Re}(\lambda)/\lambda \leq 0.6$, and the polarizing plate including a polarizing plate transmission axis and said retardation plate including a lag axis with said lag axis and transmission axis crossing each other.

The present invention also includes a plate for circularly polarizing light, comprising a polarizing plate and a retardation plate laminated to the polarizing plate, the retardation plate comprising a material including a positive intrinsic double refraction value and a material including a negative intrinsic double refraction value, said retardation plate including retardation values for wavelengths of $\lambda$, defined as Re($\lambda$), and for each of $\lambda=450$ nm, $\lambda=550$ nm and Re($\lambda=$ 450)<Re(λ=550)<Re(λ=650) 0.2≦Re(λ)/λ≦0.3, and the polarizing plate including a polarizing plate transmission axis and said retardation plate including a lag axis, with said lag and transmission axis crossing each other.

The present invention also includes a plate for circularly polarizing light, comprising a polarizing plate and a retardation plate laminated to the polarizing plate, the retardation plate comprising a first layer comprising a material including a positive intrinsic double refraction value and a second layer comprising a material including a negative intrinsic double refraction value, said first layer and said second layer comprising double refraction, each layer including a lag axis with the layers laminated to one another with the lag axis of one layer substantially orthogonal to the lag axis of the other layer, said retardation plate comprising retardation value for wavelengths of λ, defined as Re(λ), and for each of λ=450 nm, 550 nm and 650 nm, 0.2≦Re(λ)/λ≦0.3, and the polarizing plate including a polarizing plate transmission axis and said retardation plate including a lag axis with said lag axis and the transmission axis crossing each other.

The present invention also includes a reflection-type liquid crystal display device comprising:

(a) a reflection plate;
(b) a polarizing plate; and
(c) a liquid crystal cell and a retardation plate disposed between the reflection and polarizing plates, the retardation plate comprising a material including positive intrinsic double refraction, and a material including negative intrinsic double refraction, wherein the materials result in retardation values for the retardation plate for at least wavelengths of 450 nm, 550 nm, and 650 nm, with the retardation value for wavelengths of 450 nm being less than the retardation value for wavelengths of 550 nm, and the retardation value for wavelengths of 550 nm, being less than the retardation value for wavelengths of 650 nm.

The present invention also includes a reflection-type liquid crystal display device comprising:

(a) a reflection plate;
(b) a polarizing plate;
(c) a liquid crystal cell and a retardation plate disposed between the reflection and polarizing plates, the retardation plate including:
  (i) a first layer comprising a material including a positive intrinsic double refraction value and a lag axis; and
  (ii) a second layer comprising a material including a negative intrinsic double refraction value and a lag axis, with the first and second layers laminated to one another with the lag axis of each layer substantially orthogonal to one another.

The present invention further includes a method of forming a retardation plate, the method comprising the steps of:

(a) extruding a first resin comprising a positive intrinsic double refraction value to form a first plate layer;
(b) extruding a second resin comprising a negative intrinsic double refraction value to form a second plate layer; and
(c) laminating the first and second plate layers to one another to form a laminate.

BRIEF DESCRIPTION OF THE DRAWINGS

FIG. 1 is a schematic sectional view of one embodiment of a retardation plate of the present invention;

FIG. 5 is a sectional view of a die of an extrusion device employed in the examples;

FIG. 6 is a graph showing a chromatic dispersion of retardation of 19% stretched film and 39% stretched film prepared in example 4;

FIG. 7 is a schematic sectional view of a stretched film prepared in example 5;

FIG. 8 is a graph showing a chromatic dispersion of retardation of a stretched film prepared in example 5; and FIG. 9 is a graph showing a chromatic dispersion of retardation of a stretched film prepared in comparative examples 7 and 8.

DESCRIPTION OF THE PREFERRED EMBODIMENTS

Retardation Plate

Figure 2:
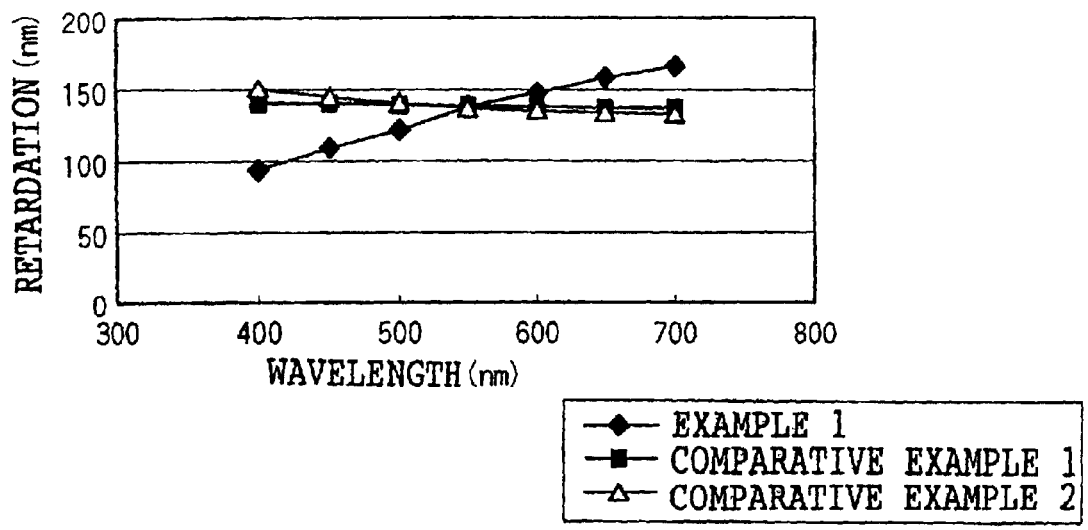
FIG. 2 is a graph showing results of measuring chromatic dispersion of Re values in the visible light region, of the fabricated retardation plate.

A retardation plate of the present invention contains at least one type of material including a positive intrinsic double refraction value (hereinafter, sometimes referred to only as "positive material") and a material including a negative intrinsic double refraction value (hereinafter, sometimes referred to only as "negative material"), respectively, and further contains the other components selected as appropriate according to the necessity. A retardation plate of the present invention includes both of an embodiment in which a positive material and a negative material are included in the same layer and an embodiment in which a positive material and a negative material are respectively included in different layers. In a retardation plate of the present invention, incident light is retarded by one layer or multiple layers containing positive or negative materials. When the molecular alignment is made the same for the positive and negative materials by a stretching operation or the like, because the lag axes of the positive and negative materials cross, the retardation of the laminate is the result of the combined retardation of each of the positive and negative materials respectively. In the present invention, by combining positive material and negative material in various ways, and/or by adjusting preparation conditions such as stretching conditions, the chromatic dispersion property of the retardation expressed is controlled. It thereby becomes possible to provide a retardation plate in which Re/λ gives an approximately uniform retardation to incident light of the entire visible light region.

First, a positive material and a negative material used in a retardation plate of the present invention will be described.

A Material Including a Positive Intrinsic Double Refraction Value

In the present invention, the term "a material including a positive intrinsic double refraction value" refers to a material which has optically positive uniaxial property when the molecules have been uniaxially aligned. For example, if the positive material is a resin, when a light is incident on the layer in which molecules are aligned uniaxially, the term refers to a resin in which the refraction index of light in the alignment direction is larger than the refraction index of light in a direction orthogonal to the alignment direction. Examples of the positive materials include various materials such as a resin, a rod-like liquid crystal, a rod-like liquid crystal polymer and the like. These may be used singly or in combinations of two or more. In the present invention, a resin is preferable of these examples.

Examples of the resins include olefin based polymers (for example, polyethylene, polypropylene, norbornene based polymer, cycloolefin based polymer and the like), polyether based polymer (for example, polyethylene terephthalate, polybutylene terephthalate and the like), polyallylene sulfide based polymer (for example, polyphenylene sulfide and the like), polyvinyl alcohol based polymer, polycarbonate based polymer, polyacrylate based polymer, cellulose ether based polymer (there is also a material in which the intrinsic double refraction value is negative), polyester sulfone based polymer, polysulfone based polymer, polyallyl sulfone based polymer, polychloride vinyl based polymer, or their multi-dimensional (the second dimensional, the third dimensional and so fourth) co-polymers and the like. These also may be used singly or in combinations of two or more.

In the present invention, of these examples, an olefin based polymer is preferable and a norbornene based polymer is particularly preferable from the viewpoints of light transmittance, heat resistance, dimensional stability, photo-elasticity and the like. Examples of the olefin based polymer preferably include "Artsoh" manufactured by Nihon Synthetic Rubber, Co., Ltd., "Zeonex" and "Zeonoah" manufactured by Nippon Zeon, Co., Ltd., "APO" manufactured by Mitsui Petroleum Chemical, Co., Ltd. and the like.

The norbornene based polymer comprises norbornene skeleton which is as a repeating unit. Specific examples include those described in JP-A No. 62-252406, JP-A No. 2-133413, JP-A No. 63-145324, JP-A No. 63-264626, JP-A No. 1-240517, Japanese Examined Patent Publication No. 57-8815, JP-A No. 5-39403, JP-A No. 5-43663, JP-A No. 5-43834, JP-A No. 5-70655, JP-A No. 5-279554, JP-A No. 6-206985, JP-A No. 7-62028, JP-A No. 8-176411, JP-A No. 9-241484 and the like. However, examples are not limited to these. Moreover, these may be used singly or in combinations of two or more.

In the present invention, of the norbornene based polymers, those having a repeating unit represented by any one of the following structural formulae (I)–(IV) are preferable.

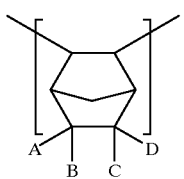

(I)

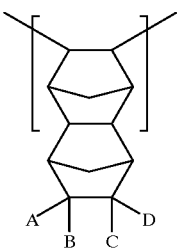

(II)

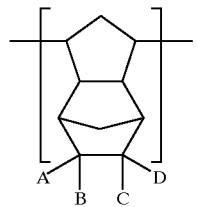

(III)

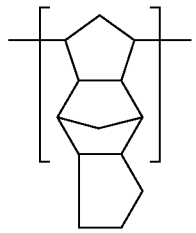

(IV)

In the structural formulae (I)–(IV), A, B, C and D each independently represents a hydrogen atom or a monovalent organic group.

Moreover, a hydrogenated copolymer obtained by hydrogenating a polymer obtained by performing metathesis polymerization of at least one kind of compound represented by the following structural formula (V) or (VI) and an unsaturated cyclic compound which is capable of performing copolymerization with the above-described compound is also preferable of the norbornene based polymers.

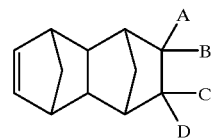

(V)

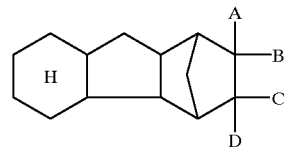

(VI)

In the structural formulae, A, B, C and D each independently represents a hydrogen atom or a monovalent organic group, respectively.

The weight average molecular weight of the norbornene based polymer, is in the order of 5,000–1,000,000, and is preferably 8,000–200,000.

A Material Including a Negative Intrinsic Double Refraction Value

In the present invention, the term "a material including a negative intrinsic double refraction value" refers to a material which has optically negative uniaxial properties when molecules have been aligned uniaxially. For example, in the case where the negative material is a resin, the term refers to a resin in which the refraction index of the light in the alignment direction is smaller than refraction index of the light in a direction orthogonal to said alignment direction at the time when a light is incident on the layer in which molecules are aligned uniaxially. Examples of the negative materials include a variety of materials such as a resin, a discotic liquid crystal, a discotic liquid crystal polymer and the like. These may be used singly or in combinations of two or more. In the present invention, a polymer is preferable of these examples.

Examples of the polymers include polystyrene, polystyrene based polymers (styrene and/or and copolymer of a styrene derivative and other monomer), polyacrylonitrile based polymers, polymethylmethacrylate based polymers, cellulose ester based polymers (these also include materials in which the intrinsic double refraction value is positive), or their multi-dimensional (two dimensional, three dimensional and the like) copolymerization polymers and the like. The polystyrene based polymers preferably include a copolymer of styrene and/or styrene derivatives and at least one compound selected from acrylonitriles, maleic anhydrides, methylmethacrylates and butadienes. In the present invention, it is preferably at least one selected from polystyrene, polystyrene based polymer, polyacrylonitrile based polymer and polymethylmethacrylate based polymer, among these, it is more preferably polystyrene and polystyrene based polymer from the viewpoint of high double refraction expression property, and styrene and/or a copolymer of a styrene derivative and maleic anhydride is particularly preferable from the viewpoint of heat resistance.

It should be noted that in the case where a retardation plate of the present invention is utilized for optical uses (display elements and the like), a polymer having a glass transition temperature of 110° C. or more (more preferably 120° C. or more) is preferably used.

A Preferable Combination of a Positive Material and a Negative Material

In the present invention, it is preferable to combine a material including a positive intrinsic double refraction value and a material including a negative intrinsic double refraction value with satisfying the conditions indicated below as criteria.

In the case where the absolute value of retardation (Re) in the wavelengths of 450 nm and 550 nm are defined as Re(450) and Re(550), examples are the combinations in which the value of (Re(450)/Re(550)) of the positive material and the value of (Re(450)/Re(550)) of the negative material are not equal (that is to say, one is smaller than the other, or one is larger than the other). More specifically, it is preferably a combination in which difference between both values is 0.03 or more, and more preferably a combination in which the difference between both values is 0.05 or more.

Moreover, a combination in which the value of Re(550) of the positive material is smaller than the value of Re(550) of the negative material when the (Re(450)/Re(550)) value of the positive material is larger than the (Re(450)/Re(550)) value of the negative material, or in which the value of Re(550) of the positive material is larger than the value of Re(550) of the negative material when the (Re(450)/Re(550)) value of the positive material is smaller than the (Re(450)/Re(550)) value of the negative material, is preferable.

Next, a preferable combination in the case where the positive material and the negative material respectively are resins will be described.

If a resin having large chromatic dispersion of an intrinsic double refraction value ($\Delta n$) is used as a negative material, it is preferable to use a resin having small chromatic dispersion of an intrinsic double refraction value ($\Delta n$) as a positive material. And if a resin having small chromatic dispersion of an intrinsic double refraction value ($\Delta n$) is used as a negative material, it is preferable to use a resin having large chromatic dispersion of an intrinsic double refraction value ($\Delta n$) as a positive material. For example, if a norbornene based polymer is used as the positive material, it is preferable to use those having a large chromatic dispersion of their intrinsic double refraction value as the negative material. Specifically, if intrinsic double refraction values ($\Delta n$) of the wavelength of 450 nm and 550 nm are defined as $\Delta n$ (450) and $\Delta n$ (550), it is preferably selected from resins satisfying the following relational expression:

$$|\Delta n(450)/\Delta n(550)| \geq 1.02$$

Furthermore, it is more preferably selected from resins satisfying the following relational expression:

$$|\Delta n(450)/\Delta n(550)| \geq 1.05$$

It should be noted that the value of $|\Delta n(450)/\Delta n(550)|$ is more preferable as it becomes larger. However, in the case of resins, it is in general, 2.0 or less.

More specifically, when the negative material is polymethylmethacrylate or the like whose (Re(450)/Re(550)) value is small, the examples of the positive material with which the negative material is combined preferably include polyethylene terephthalate based polymers, polyphenylene sulfide based polymers, polycarbonate based polymers, polyallylate based polymers, polyether sulfone based polymers, polysulfone based polymers, polyallyl sulfone based polymers, polychloride vinyl based polymers or the like.

Moreover, in the case where the negative materials are polystyrene and polystyrene based polymer whose (Re(450)/Re(550)) value are large, the examples of the positive material with which the negative material is combined preferably include olefin based polymers and cycloolefin based polymers (for example, polyethylene, polypropylene, norbornene based polymer or the like), cellulose ester based polymers or the like. Of these, the combination of polystyrene and/or polystyrene based polymer as a negative material with norbornene polymers of the olefin polymers as a positive material is particularly preferable.

Other Components

There are no particular limitations on the other components that may be included provided the effects of the present invention are not compromised. The selection can be performed as appropriate according to the purposes. For example, phase solution agents and the like may be favorably included. The phase solution agent can be preferably used in such a case where the mixture causes phase separation or the like in a retardation plate having a layer containing a mixture of the positive material and the negative material, a mixture state of the positive material and the negative material can be favorably made by using the phase solution agent.

Hereinafter, an embodiment of a retardation plate of the present invention will be described.

As example of an embodiment of a retardation plate of the present invention is a film or a sheet comprising a polymer blend of a resin including a positive intrinsic double refraction value and a resin including a negative intrinsic double refraction value. When retardation values in the wavelengths of 450 nm, 550 m, and 650 nm of the film or sheet are defined as Re(450), Re(550) and Re(650), the relationship is such that Re(450)<Re(550)<Re(650).

A retardation plate of the present embodiment can be fabricated by a variety of methods. For example, according to the above criteria, a positive material and a negative material are appropriately selected, the blending proportion is determined, the phase solution agent and the like are added, and these are blended. Then, subsequently, this blended compound is dissolved in a given organic solvent to thereby prepare a coating liquid, the coating liquid is coated on the supporting body (or provisional supporting body) and dried, thereby film-formation is possible (solution film-forming method). Or the blended compound is pelletized, fused and extruded, thereby film-formation is possible (extrusion molding method).

A retardation plate satisfying the relationship of Re(450) <Re(550)<Re(650) can be made by including a stretching treatment for a film prepared by the above-described methods. Examples of the stretching preferably include longitudinal uniaxial stretching in a mechanical flow direction, transversal uniaxial stretching (for example, tenter stretching) in a direction orthogonal to a mechanical flow direction and the like, however, in the case where the stretching is not much biaxial stretching may also be used. Details of adjustment of a retardation by stretching are similar to those of a method of adjusting a retardation in a retardation plate of the laminated structure described later. It should be noted that in the case where film-like or sheet-like retardation plate already exhibits such a retardation in the desired range, it can be used as it is without stretching treatment.

In the case where a retardation plate of the present invention is applied to the use of a plate for circularly polarizing light ($\lambda/4$ plate ), it is required that the value of (retardation (Re)/wavelength) is 0.2–0.3 for at least wavelengths of 450 nm, 550 nm and 650 nm in the wide wavelength range from 450 nm to 650 nm, that is to say, the value of retardation (Re) in the wavelength of 550 nm is 110 nm-165 nm, and has a positive correlation with the wavelength. More preferably, in at least wavelengths of 450 nm, 550 nm and 650 nm, the value of (retardation (Re)/ wavelength) is 0.23–0.27, and still more preferably 0.24–0.26.

Moreover, in the case where a retardation plate of the present embodiment is used for $\lambda/2$ plate, it is required that the value of (retardation (Re)/wavelength) is 0.40–0.60 for at least wavelengths of 450 nm 550 nm and 650 nm of the wide wavelength range from 450 nm to 650 nm, that is to say, the value of retardation (Re) for the wavelength of 550 nm is 220 nm–330 nm, and it has a positive correlation with the wavelength. More preferably, in at least wavelengths of 450 nm, 550 nm and 650 nm, the value of (retardation (Re)/wavelength) is 0.46–0.54, and still more preferably 0.48–0.52.

In a retardation plate of the present embodiment, in a layer comprising a mixture of the positive material and the negative material (polymer blend when the material is a resin), the molecular alignment of each material is in the same direction. When the molecular alignments of the positive material and negative material are the same, lag axes are naturally orthogonally crossed, and chromatic dispersion of the retardation of each material independently, is reduced by each other. A retardation plate giving an approximately uniform retardation can be provided for incident light in the entire visible region. Therefore, a retardation plate of the present invention uniformly retards light in the broad band range (visible light region) and upon fabrication, does not require a step of laminating layers and can be formed with a single material and thus cost is reduced.

Another embodiment of a retardation plate of the present invention is shown in FIG. 1.

A retardation plate 10 is configured such that a layer 12 comprising a resin including a positive intrinsic double refraction value and, a layer 14 comprising a resin including a negative intrinsic double refraction value are laminated. The layers 12 and 14 have double refraction and are laminated such that their lag axes are orthogonally crossed with each other. Specifically, the molecular alignment direction of the positive resin contained in the layer 12 and the molecular alignment direction of the negative resin contained in the layer 14 are the same. Since a retardation of the retardation plate 10 is the sum of the respective retardations of the layer 12 and the layer 14, a retardation of the short wavelength of the retardation plate 10 can be small and a retardation of the long wavelength of the retardation plate 10 can be large by laminating such that the lag axis of the layer 12 and the lag axis of the layer 14 cross each other. As a result, the ratio Re($\lambda$)/$\lambda$ in wavelength $\lambda$ of the retardation Re($\lambda$) and the wavelength can be approximately made constant in the entire visible light region.

As to a retardation plate of the present embodiment, it is preferable that in the case where the values of retardation (Re) for the wavelengths of 450 nm, 550 nm and 650 nm is defined as Re(450), Re(550) and Re(650), respectively, these satisfy the following expression:

Re(450)<Re(550)<Re(650)

In order to satisfy the above relational expression, when a material having a small chromatic dispersion of its intrinsic double refraction is used as a positive resin, a material having a large chromatic dispersion of its intrinsic double refraction value is preferably used as a negative resin. Also when a material having a large chromatic dispersion of its intrinsic double refraction is used as a positive resin, a material having a small chromatic dispersion of its intrinsic double refraction is used as a negative resin. Examples of such preferable combinations of the materials are as aforedescribed.

In the case where a retardation plate of the present embodiment is used as a plate for a circularly polarizing light ($\lambda/4$ plate), it is required that the value of (retardation (Re)/wavelength) is 0.2–0.3 for at least wavelengths of 450 nm, 550 nm, and 650 nm of the wide wavelength range from 450 nm to 650 nm. More preferably, for at least wavelengths of 450 nm, 550 nm and 650 nm, the value of (retardation (Re)/wavelength) is 0.23–0.27, and still more preferably 0.24–0.26. Moreover, in the case where a retardation plate of the present embodiment is used as a $\lambda/2$ plate, it is required that the (retardation (Re)/wavelength) value is 0.40–0.60 for at least wavelengths of 450 nm 550 nm and 650 nm of the wide wavelength range from 450 nm to 650 nm. More preferably, in at least wavelengths of 450 nm, 550 nm and 650 nm, the (retardation (Re)/wavelength) value is 0.46–0.54, and still more preferably 0.48–0.52.

In the present embodiment, the chromatic dispersion can be adjusted by changing stretching conditions such as stretching temperature, stretching ratio and the like.

In the present embodiment, a retardation plate of a structure having respective one layer comprising positive and negative resins is described. However, a retardation plate of the present invention is not limited to this structure. The structure of the film may have a third and a fourth layer. Forming a third and fourth layer improves physical properties of the retardation plate and is thus preferable. Particularly, it is preferable to have the third layer having a double refraction so that a cross-section of the retardation plate is symmetrical. In the case where the third layer comprises a resin including a positive intrinsic double refraction value, an aspect in which a layer comprising a resin including a positive intrinsic double refraction values, a layer comprising a resin including a negative intrinsic double refraction value and a layer comprising a resin including a positive intrinsic double refraction value are laminated in that order is preferred. In the case where the third layer comprises a resin including a negative intrinsic double refraction value, an aspect in which layers comprising resins whose intrinsic double refraction values are negative, positive and negative respectively are laminated in that order is preferred. Moreover, in an aspect having a three-layer structure, the layer comprising resins in which the positive or negative sign of intrinsic double refraction values are the same, it is preferable to laminate the layers such that their lag axes are the same. Moreover, resins in which sign of intrinsic double refraction values are the same, are preferably made of the identical material.

Moreover, a layer for enhancing the adhesions of both layers (hereinafter, sometimes referred to as "adhesive layer") may be disposed between a layer comprising a resin including a positive intrinsic double refraction value and a layer comprising a resin including a negative intrinsic double refraction value. A material having affinity for both of the resins including positive or negative intrinsic double refraction values can be used for the adhesive layer. For example, in the case where a norbornene based polymer is used as a resin including a positive intrinsic double refraction value and polystyrene (or polystyrene based polymer) is used as a resin including a negative intrinsic double refraction, it is preferable that the adhesive layer is a layer having any one of an olefin based polymer and polystyrene (or styrene based polymer) and is a layer comprising a polymer whose glass transition temperature is 5° C. or more lower than that of the positive resin and negative resin (more preferably, more than 10° C. lower). However, the resins that may be used are not limited to these examples. It should be noted that it is preferable that the product of the double refraction and the thickness of the adhesive layer is small.

A retardation plate of the present embodiment can be fabricated by a variety of methods. For example, a coating solution in which the positive resin and the negative resin respectively are dissolved in a solvent, is prepared, and the relevant coating liquid is in turn coated (or at the same time, superimposed and coated) on the supporting body (or provisional supporting body) and dried to thereby form a film. Also, the fabrication can be carried out by utilizing co-extrusion. Among these methods, the fabrication preferably is carried out using the co-extrusion of the present invention described below, since the fabrication cost is reduced as well as the fabrication process is simple.

A method of fabricating a retardation plate of the present invention includes a step of co-extruding a resin including a positive intrinsic double refraction value (hereinafter, sometimes referred to only as "positive resin") and a resin including a negative intrinsic double refraction value (hereinafter, sometimes referred to only as "negative resin") and a step of preparing a laminate by laminating the first layer comprising a positive resin and a second layer comprising a negative resin. In the case where this laminate exhibits the desired retardation and the like, the laminate can be used for a retardation plate as it is. In the case where the laminate does not exhibit the desired retardation, the laminate may be stretched and subjected to the step of adjusting the retardation as an additional step.

In the step of forming the laminate, for example, a positive resin and a negative resin are respectively supplied to an extruder, and heated and pressurized so as to be in a fluid state. The respective fluids are sequentially extruded from a die, and made into a laminate. Subsequently, the laminate is sequentially inserted and passed through a nip portion of a nip roll, and pressurized and fixed.

It should be noted that in the case where a retardation plate of an aspect having the third layer is prepared, in the step of forming the laminate, a positive or negative resin constituting the third layer is supplied to the extruder, and a laminate having a three-layer structure is formed by performing co-extrusion. For example, in the case where a retardation plate of an aspect having a layer for enhancing adhesion between a layer comprising a positive resin and a layer comprising a negative resin, in the step of forming the laminate, a resin for enhancing adhesion is provided separately, and a laminate is formed such that a layer for enhancing adhesion is disposed between the layer comprising a positive resin and the layer comprising a negative resin. Moreover, a plurality of flow paths are provided between the area in the extruder containing the resin and the area containing the die extruder and, for example, a laminate having a five-layer structure which comprises three kinds of resins of the configuration of a positive resin/a resin for the third layer/a negative resin/a resin for the third layer/a positive resin can be formed.

A step of adjusting a retardation by stretching the laminate which may be included if desired can be carried out by employing a variety of extruders. For example, a longitudinal uniaxial stretching in a mechanical flow direction, a tenter stretching in a direction orthogonal to a mechanical flow direction and the like can be preferably utilized, besides these can be biaxial in order to control a thickness direction. Now, it is preferable that the stretching temperature is set at $(Tg_{min}-20)° C.-(Tg_{min})° C.$ when the lowest glass transition temperature of the basic materials (positive resin and negative resin) comprising the layers is defined as $Tg_{min}$.

So as to satisfy the property represented by the inequality of Re(450)<Re(550)<Re(650), the factors can be controlled by adjusting weight ratio, stretching temperature, stretching ratio of positive and negative resins.

The following is an example of an adjustment method in the case where a norbornene based polymer is used as a positive resin and polystyrene is used as a negative resin. The melting and softening temperatures of polystyrene and norbornene polymers are defined as Ts and Tn, respectively. Since Ts<Tn, a laminate of a layer comprising a norbornene polymer and a layer comprising polystyrene is stretched at the temperature close to Tn and alignment relaxation of polystyrene molecules is rapid, most of the molecules of the layer comprising polystyrene are not aligned, and the layer comprising polystyrene does not have double refraction. As a result, a chromatic dispersion of a laminated film formed of a layer comprising a norbornene polymer and a layer comprising polystyrene is approximately equal to that of the layer comprising a norbornene polymer. As the stretching temperature is lowered, the polystyrene molecules become aligned and the layer comprising polystyrene gains double refraction. Since a retardation of the layer comprising polystyrene is negative, the positive retardation of the layer comprising a norbornene polymer is reduced. The reduction of a retardation is largely for the shorter wavelengths because of chromatic dispersion of polystyrene, and as a result, a condition in which Re(450)<Re(550)<Re(650) is obtained. Re($\lambda$)/$\lambda$ is made constant in the entire visible light region and a retardation plate exhibiting a uniform retardation property can be made for a broad band by controlling the stretching temperature. Moreover, the properties of broad band ¼ wavelength and ½ wavelength can be obtained by adjusting stretching ratio.

When a retardation plate having the adhesive layer between a layer comprising a positive resin and a layer comprising a negative layer, it is preferable to use a resin having a melting and softening temperature lower than the stretching temperature as a resin constituting the foregoing adhesive layer. Specifically, it is preferable to use a resin whose glass transition temperature is lower, and a resin whose glass transition temperature is 5° C. or more lower, and still more preferably 20° C. or more lower than those of resins including positive or negative intrinsic double refraction values respectively.

In the present embodiment, a retardation plate is provided which comprises two layers each layer including a positive resin and a negative resin respectively, and in which by said layers being laminated such that their lag axes cross orthogonally, the retardation of each of the layers is reduced by each other, and which can thus achieve substantially uniform retardation of incident light of the entire visible spectrum. Further, as to two layers comprising positive and negative resins, it is sufficient to make the stretching direction of the layers the same to make their lag axes orthogonally crossed. A step of cutting the chips and the like can be omitted. Specifically, since a retardation plate of the present invention is a laminate of respective layers in which two kinds of resins whose intrinsic double refraction values have different signs are used, if the stretching directions of the two layers are made the same, lag axes of the two layers will necessarily be made to cross. For example, the fabrication by a simple process can be realized since operations such as delicate and troublesome angle adjustment at the time of cutting off the chips and adhering of the chips of the stretched film which are necessary for the preparation of conventional laminated type retardation plate utilizing the afore-described co-extrusion are no longer necessary. More specifically, although a retardation plate of the present embodiment is a laminate which can give a uniform retardation to the light of broad band (visible light region), it can be formed at a low cost and by a simple process, and by the utilization of co-extrusion and the like as well. Moreover, in the present embodiment it is not necessary to consider phase solubility of the materials when selecting the materials. Since the range from which the selection is made is wider, this embodiment is preferable. Also, selection of the materials in consideration of glass transition temperature can be realized. Moreover, it is advantageous from the viewpoint that the cost of an extruding device is low and is therefore the most preferable aspect of the present invention.

A retardation plate of the present invention (including both of a single layer structure and a structure of laminated layers (same, hereinafter) can be made a broad band ¼ wave plate by adjusting $Re(\lambda)/\lambda$, and employed for reflection-type liquid crystal display device in personal computers, AV devices, portable type information communication devices, game and simulation devices, navigation systems for a car and the like. Moreover, a retardation plate of the present invention can be made a broad band ½ wave plate by adjusting $Re(\lambda)/\lambda$, and utilized in a PBS for a projector and the like.

The photoelasticity of a retardation plate of the present invention is preferably 20 Brewster's or less, more preferably 10 Brewster's or less, and still more preferably 5 Brewster's or less. In general, when a retardation plate is employed in a member of a display element, it is adhered to other members (for example, a light polarizing plate). There is a bias in the stress at the time of adhesion and a larger stress is exerted on the edge portion compared to the center portion. As a result, difference of retardation may occur, the edge portion may include whitish lights, and the display property of a display element may be lowered. When the photoelasticity of the retardation plate is in the foregoing range, even if there is a bias of stress at the time of adhering, the occurrence of difference in retardation in parts can be suppressed. Therefore the invention becomes more advantageous for use as a member of a display element and the like.

Next, a plate for circularly polarizing light and $\lambda/2$ plate utilizing a retardation plate of the present invention will be described.

It should be noted that a retardation plate of the present invention applied to the following uses includes retardation plates of both the embodiments having a single layer structure and a laminated structure.

(Plate for Circularly Polarizing Light and $\lambda/2$ Plate)

A plate for circularly polarizing light of the present invention comprises a polarizing plate and a retardation plate of the present invention. The (retardation (Re)/wavelength) value of the retardation plate is preferably 0.2–0.3 for at least wavelengths of 450 nm, 550 nm and 650 nm in the wide wavelength range from 450 nm to 650 nm. More preferably, for at least the three wavelengths, the (retardation (Re)/wavelength) value is 0.23–0.27, and still more preferably 0.24–0.26. Moreover, a $\lambda/2$ plate of the present invention laminates a polarizing plate and a retardation plate of the present invention. As to the retardation plate, the value of (retardation (Re)/wavelength) is preferably 0.40–0.60 for at least wavelengths of 450 nm, 550 nm and 650 nm in the wide wavelength range from 450 nm to 650 nm. More preferably, for at least the three wavelengths, the (retardation (Re)/wavelength) value is 0.46–0.54, and still more preferably 0.48–0.52.

Polarizing Plate

The polarizing plate is not particularly limited and conventional and known light polarizing plates can be favorably used. Preferable examples include an iodine based polarizing plate, a dye based polarizing plate using dichroism dye, a polyene based polarizing plate and the like.

Among these polarizing plates, the iodine based polarizing plate and the dye based polarizing plate, in general, can be fabricated by stretching a polyvinyl alcohol based film and fixing iodine or dichroism dye thereon. In this case, a polarization axis of the polarizing plate is in a direction orthogonal to the direction of stretching of the film.

The polarizing plate may also have a protection layer.

The protection layer preferably comprises a material having a high optically isotropic property. As such materials, for example, cellulose ester, and particularly, triacetylcellulose are preferable.

Laminated Layers

The polarizing plate and the retardation plate are laminated so that polarizing plate transmission axis of the polarizing plate and lag axis of the retardation plate (the maximum refraction index direction) are crossed. The angle of crossing is preferably from 30° to 60°, more preferably from 40° to 50°, and particularly preferably from 43° to 47°.

Uses

A plate for circularly polarizing light of the present invention has a simple structure, is easily fabricated, and functions as a broad band $\lambda/4$ plate, can be utilized in a variety of fields, and particularly, can be favorably used for a reflection-type liquid crystal display device of the present invention described later. Moreover, a $\lambda/2$ plate of the present invention functions as a broad band $\lambda/2$ plate, can be utilized in a variety of fields, and is favorable a for PBS for a projector and the like.

Reflection-type Liquid Crystal Display Device

A reflection-type liquid crystal display device of the present invention comprises a reflection plate, a liquid crystal cell and a polarizing plate which are laminated in that order, and has a retardation plate of the present invention disposed between the reflection plate and the polarizing plate. Preferable examples of the reflection-type liquid crystal display device are a structure in which a reflection plate, a liquid crystal cell, a retardation plate of the present invention and a polarizing plate are laminated in that order, and a structure in which a reflection plate, a retardation plate of the present invention, a liquid crystal cell and a polarizing plate are laminated in that order. A retardation plate having a λ/4 property can be used as the retardation plate and, its preferable range of Re/λ is the same as the preferable range for a retardation plate used for a plate for circularly polarizing light afore-described. Moreover, a reflection-type liquid crystal display device of the present invention may further include other members and the like according to necessity.

It should be noted that in the reflection-type liquid crystal display device, in the case where the retardation plate and the polarizing plate are laminated, this laminate corresponds to a plate for circularly polarizing light of the present invention.

Reflection Plate

The reflection plate is not particularly limited and conventional and known reflection plates can be favorably used.

The reflection plate is, in general, disposed at the outside of a back transparent substrate of a liquid crystal cell described below.

Liquid Crystal Cell

The liquid crystal cell is not particularly limited and conventional and known liquid crystal cells can be favorably used. A preferable example of the liquid crystal cell configured so that TN type liquid crystal layer is provided in the area between a surface transparent substrate and a back transparent substrate. In this case, electrode layers comprising conduction film of ITO (indium tin oxide) are formed between the surface transparent substrate and the back transparent substrate. It should be noted that, in the present invention, not only the TN type liquid crystal layer, but also STN type liquid crystal layer may be used as a liquid crystal layer.

The drive of the liquid crystal cell may be a matrix drive or a segment drive, and in the case of the matrix drive, it may be a simplified matrix drive method or an active matrix drive method.

Polarizing Plate

The polarizing plate is not particularly limited. Conventional and known polarizing light plates can be favorably used. Examples include the polarizing plates described above.

In general, the polarizing plate is disposed along with a retardation plate of the present invention at the outside of the surface transparent substrate of the liquid crystal cell.

The reflection-type liquid crystal display device described above is a device for black and white display, however, in the present invention, it may further be used for a color display if a color filter layer is formed on the surface transparent substrate by disposing the layer between the surface transparent substrate and a retardation plate of the present invention.

Hereinafter, a black and white display function of a reflection-type liquid crystal display device of the present invention will be described.

In a state where voltage is not applied to the electrode layer (white display), when a light is incident on the polarizing plate, this incident light is converted to a straight line polarized light in the polarization axis direction by the polarizing plate. This straight line polarized light is converted into a circularly polarized light by a retardation plate of the present invention, and is made incident on the liquid crystal cell. This circularly polarized light reaches the reflection plate as a straight line polarized light parallel to a polarization axis is reflected by the reflection plate and again made incident on the liquid crystal cell. The incident straight line polarized light becomes a circularly polarized light again by the liquid crystal layer, via the retardation plate, is again converted into a straight line polarized light parallel to a polarization axis and transmitted through the polarizing plate and to form a white display.

Next, in a state where a voltage higher than the liquid crystal saturation voltage is applied to the electrode layers (black display), a straight line polarized light transmitted through the polarizing plate is converted into a circularly polarized light by the retardation plate of the present invention. Then, this circularly polarized light is reflected by the reflection plate as it is, and transmitted through the liquid crystal cell as it is, and then transmitted through the retardation plate of the present invention. Specifically, since the straight line polarized light is transmitted through the retardation plate of the present invention twice with the reflection plate therebetween before reaching the polarizing plate again, the retardation of the straight line polarized light is shifted by 90°, and the reflected light from the reflection plate does not transmit through the polarizing plate and thereby becomes a black display.

In a reflection-type liquid crystal display device of the present invention, a straight line polarized light in the almost all of the visible light region is converted into a circularly polarized light by the retardation plate of the present invention of a broad band. As a result, coloring and lowering of contrast due to the chromatic dispersion of the light incident on the foregoing liquid crystal cell is reduced and the high contrast display can be realized.

EXAMPLE

Hereinafter, examples of the present invention will be described, however, the present invention is not limited to these examples.

Example 1

As a material including a negative intrinsic double refraction value, polystyrene (HRM2211L made by Shin Nippon Steel Chemical, Co., Ltd.) was used, and as a material including a positive intrinsic double refraction value, a norbornene resin (Arton made by JSR, Co., Ltd.) was used. Both were blended at weight ratio of 23:77 (polystyrene: norbornene resin), and this was dissolved in a methylene chloride solution, thereby preparing a coating solution.

It should be noted that when the absolute value of retardation (Re) for the wavelengths of 450 nm and 550 nm are defined as Re(450) and Re (550), respectively, the (Re(450)/Re(550)) value of norbornene resin is 1.01, and the (Re(450)/Re(550)) value of polystyrene is 1.05. Both values are not the same, and the difference is 0.04.

The viscosity of the coating solution is 9.8 Pa·s (98 poise), and this coating solution is flowed onto a glass plate using a doctor blade, dried, and a transparent film having a thickness of 107 μm was thereby formed. This transparent film is 13% uniaxially stretched at 150° C., and double refraction film was obtained. A chromatic dispersion of the Re value was measured for this double refraction film using a retardation measurement device (KOBRA21DH made by Ohji measurement, Co., Ltd.). The results are shown in FIG. 2.

As shown in FIG. 2, the (Re/wavelength) value of the relevant double refraction film was approximately 0.25 in the case where its Re value is for the entire visible region, and was a retardation plate showing ¼ wavelength property in a broad band. Moreover, when the photoelasticity ratio of this retardation plate was measured using "M-150" made by Nippon Spectrogram, Co., Ltd., it was founded to be 13 Brewster's.

Comparative Example 1

A double refraction film was prepared in a similar manner to that of Example 1 except that norbornene resin was not used, the viscosity of the coating solution was made 8.9 Pa·s, and the transparent film was 5% uniaxially stretched at 140° C. The chromatic dispersion of Re value was also measured in a similar manner to Example 1. The results are shown in FIG. 2.

As shown in FIG. 2, (Re/wavelength) of the relevant double refraction film was not within the range of 0.2–0.3.

Comparative Example 2

A double refraction film was prepared in a similar manner to that of Example 1 except that polystyrene was not used, the viscosity of the coating solution was 13.2 Pa·s, and the transparent film was 25% uniaxially stretched at 155° C. The chromatic dispersion of Re value was measured in a similar manner. The results are shown in FIG. 2.

As shown in FIG. 2, (Re/wavelength) of the relevant double refraction film was out of the range of 0.2–0.3.

Example 2

The retardation plate obtained in Example 1 and the polarizing plate were adhered so that a lag axis of the relevant retardation plate and a transmission axis of the relevant polarizing plate were crossed at the crossing angle of 45°. The chromatic dispersion of the Re value for this adhered body was measured using the retardation measurement device (KOBRA21DH made by Ohji Measurement, Co., Ltd.). The results are shown in FIG. 3.

Figure 3:
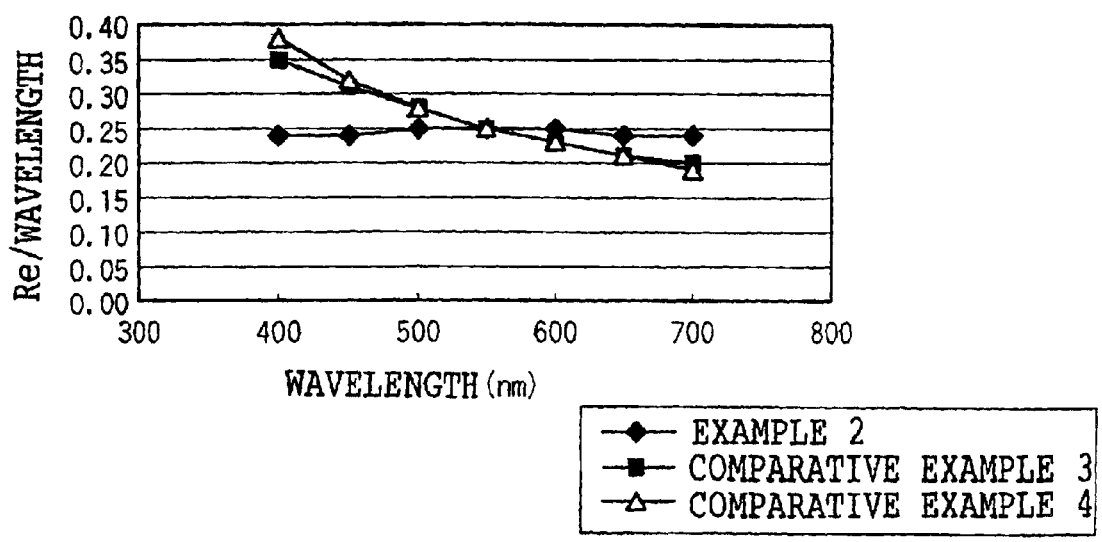
FIG. 3 is a graph showing results of measuring wavelength dependency of Re/wavelength in the visible light region, of the fabricated plate for circularly polarizing light.

As shown in FIG. 3, the (Re/wavelength) value of the relevant adhered body was approximately 0.25 for the entire visible region and the adhered body was a plate for circularly polarizing light showing a ¼ wavelength property in a broad band. Moreover, the adhered body showed approximately uniform Re value in the center portion and the edge portion, and in the edge portion, whitening and the like were not generated.

Comparative Example 3

Comparative Example 3 was carried out in a similar manner to Example 2 except that the retardation plate was substituted by the double refraction film prepared in Comparative Example 1.

As shown in FIG. 3, (Re/wavelength) of the double refraction film was out of the range of 0.2–0.3.

Comparative Example 4

Comparative Example 4 was carried out in a similar manner to Example 2 except that the retardation plate was substituted by the double refraction film prepared in Comparative Example 2.

As shown in FIG. 3, (Re/wavelength) of the double refraction film was out of the range of 0.2–0.3.

Example 3

"Game boy color" made by Nintendo, Co., Ltd. was taken to pieces, the polarizing plate and retardation plate for an player were removed, and instead of these, a plate for circularly polarizing light of Example 2 was mounted to thereby prepare a reflection-type liquid crystal display device. As a result, in this reflection-type liquid crystal display device, a clear white display was obtained. Moreover, white display was uniform and clear display in the whole region from the edge portion to the center portion was obtained.

Comparative Example 5

Comparative Example 5 was carried out in a similar manner to Example 3 except that the retardation plate was substituted by the double refraction film prepared in Comparative Example 2. As a result, in this reflection-type liquid crystal display device, yellowish color was seen in white display, and many light leakages were also seen in black display, and neither of contrast and coloring display was good.

Comparative Example 6

Comparative Example 6 was carried out in a similar manner to Example 3 except that the retardation plate was substituted by the double refraction film prepared in Comparative Example 3. As a result, in this reflection-type liquid crystal display device, yellowish color was seen in white display, and many light leakages were also seen in black display, and neither of contrast and coloring display was good.

Example 4

As a material including a positive intrinsic double refraction value, a cycloolefin based norbornene resin (Trade mane "Zeonoah 1420R"; made by Nippon Zeon, Co., Ltd.) was used, and as a material including a negative intrinsic double refraction value, polystyrene (Trade name "HF-77"; made by A & M Styrene, Co., Ltd.) was used. These resins were previously dried under nitrogen purge to reduce the amount of water and then they were used.

It should be noted that when the absolute value of retardation (Re) for the wavelengths of 450 nm and 550 nm are defined as Re(450) and Re (550), respectively, the value of (Re(450)/Re(550)) of the cycloolefin based norbornene resin is 1.005, the value of (Re(450)/Re(550)) of the polystyrene is 1.080, and thus both values are not the same, and the difference is 0.075.

Figure 4:
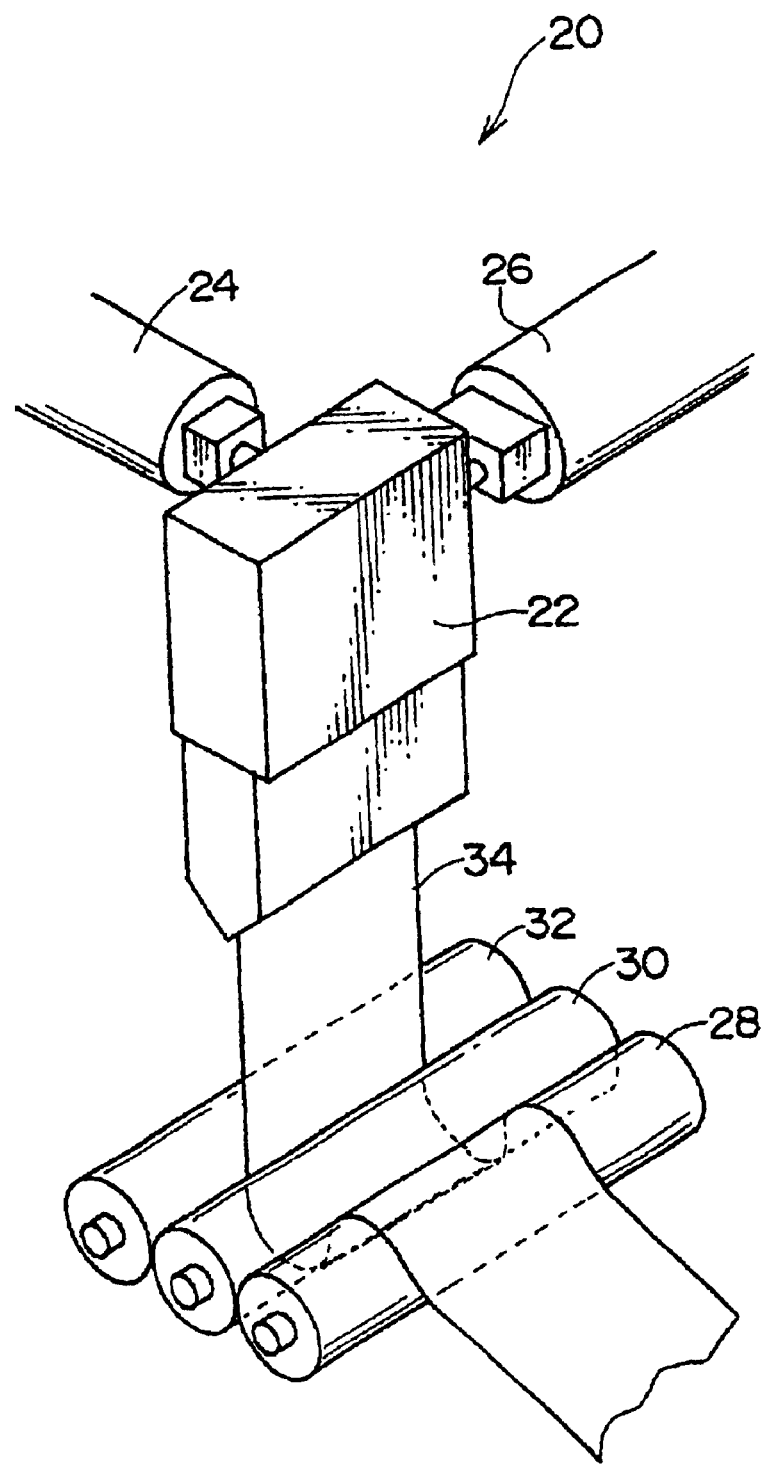
FIG. 4 is a schematic diagram of an extrusion device employed in the examples.

The device 20 having the configuration shown in FIG. 4 was employed. The device is "LABO PLASTOMILI" made by Toyo Precision Machinery, Co., Ltd., the width of the dice 22 was 250 mm. Two extruders 24 and 26 were mounted on the die 22 having a configuration such that a resin hopper stored in the extruder 24 and that in the extruder 26 become confluent within the die 22. There are two openings in the extruder 26 and in the die 22, the configuration is such that the resin hopper 1 expelled out from the extruder 24 is in the center and, the resin hopper 2 expelled from the two openings of the extruder 26 are combined from the both sides of the resin hopper 1. The inside structure of the die 22 is shown in FIG. 5. Moreover, in the lower portion of the die 22, the rolls 28, 30 and 32 are disposed and it is configured so that the thickness of the film 34, which film 34 has a three-layer structure and is pushed out from the die 22, can be adjusted.

A hopper of the polystyrene was stored in the extruder 24 and a hopper of the norbornene resin was stored in the extruder 26, and the melt formation film 34 having a three-layer structure comprising norbornene resin/polystyrene/norbornene resin was prepared. An adjustment of the thickness of the laminated film 34 was tried by peripheral velocity control of the rolls 28, 30 and 32. The peripheral velocities of the rolls 18, 20 and 22 were determined given that the final thickness of 100 μm was the target thickness, and a film of laminated layers having an actual thickness of 102 μm was obtained.

The formation conditions are shown in the following Table 1. It should be noted that the denotations of the reference numerals and letters in the following Table 1 are shown below.

C1–C3: Cylinder temperature of extruder (beneath C1 hopper)

D: Die (lip) temperature

TABLE 1

| | Sample | Extruder | Rotation number | Extrusion temperature | | | |
|---|---|---|---|---|---|---|---|
| | | | | C1 | C2 | C3 | D |
| Example 4 | Norbornene resin | φ20 single axis | 48 | 230° C. | 230° C. | 230° C. | 240° C. |
| | Polystyrene | φ20 single axis | 22 | 200° C. | 205° C. | 205° C. | 240° C. |
| Example 5 | Norbornene resin | φ20 single axis | 50 | 235° C. | 235° C. | 235° C. | 245° C. |
| | Styrene maleic anhydride | φ20 single axis | 28 | 235° C. | 235° C. | 235° C. | 245° C. |
| Comparative Example 7 | Norbornene resin | φ20 single axis | 24 | 230° C. | 230° C. | 230° C. | 240° C. |
| Comparative Example 8 | Polystyrene | φ20 single axis | 22 | 200° C. | 205° C. | 205° C. | 240° C. |

The obtained laminate film was subjected to the stretching of 19% and 39% in an atmosphere of 95° C., and the respectively stretched films were obtained. The wavelength dependencies of Re of the obtained 19% stretched film and 39% stretched film were measured using "KOBRA 21DH" made by Ohji Measurement, Co., Ltd., respectively. The results are shown in FIG. 6. From the results shown in FIG. 6, it was understood that 19% stretched film has broad band ¼ wave plate property with the Re being ¼ of the wavelength for the entire visible light region. Moreover, from the results shown in FIG. 6, 39% stretched film has a broad band ½ wave plate properties with Re being ½ of the wavelength for the entire visible light region. Moreover, the photoelasticity ratio of the respective films of laminated layers obtained was measured using "M-150" made by Nippon Spectrogram, Co., Ltd., and both were 8 Brewster's.

Example 5

As a material including a positive intrinsic double refraction value, cycloolefin based norbornene resin (Trade mane "Zeonoah 1420R"; made by Nippon Zeon, Co., Ltd.) was used, and as a material including a negative intrinsic double refraction value, a styrene based maleic anhydride copolymer resin (Trade name "Dyelark D332"; made by Nova Chemical, Co., Ltd.) was used. These resins were previously dried under nitrogen purge so that an amount of water was lowered and then they were used.

It should be noted that when the absolute value of retardation (Re) for the wavelengths of 450 nm and 550 nm are defined as Re(450) and Re (550), respectively, the value of (Re(450)/Re(550)) of the cycloolefin based norbornene resin is 1.005, the value of (Re(450)/Re(550)) of the styrene based maleic anhydride copolymer resin is 1.069, and thus both are not identical, and the difference is 0.064.

The device 20 having the configuration shown in FIG. 4 was employed. The device is "LABO PLASTOMILI" made by Toyo Precision Machinery, Co., Ltd., the width of the dice 22 was 250 mm. Two extruders 24 and 26 were mounted on the die 22 having a configuration such that a resin hopper stored in the extruder 24 and that in the extruder 26 become confluent within the die 22. There are two openings in the extruder 26 and in the die 22, the configuration is such that the resin hopper 1 expelled out from the extruder 24 is in the center and, the resin hopper 2 expelled from the two openings of the extruder 26 are combined from the both sides of the resin hopper 1. The inside structure of the die 22 is shown in FIG. 5. Moreover, in the lower portion of the die 22, the rolls 28, 30 and 32 are disposed and it is configured so that the thickness of the film 34, which film 34 has a three-layer structure and is pushed out from the die 22, can be adjusted.

A hopper of the foregoing styrene based maleic anhydride copolymer resin was stored in the extruder 24 and a hopper of the foregoing norbornene resin was stored in the extruder 26, and the melt formation film 34 of a three-layer structure comprising norbornene resin/styrene based maleic anhydride copolymer resin/norbornene resin was prepared. As for the thickness of the laminated film 34, the adjustment was tried by peripheral velocity control of the rolls 28, 30 and 32. As the peripheral velocities of the rolls 18, 20 and 22 were determined given that the final thickness of 150 μm was the target thickness, and a film of laminated layers having an actual thickness of 102 μm was obtained.

The obtained film of laminated layers was subjected to the stretching of 65% in an atmosphere of 120° C., and the stretched films having a three-layer structure were respectively obtained. A schematic sectional view of the obtained stretched film is shown in FIG. 7. The obtained stretched film 50 has a structure in which the layer 54 comprising styrene maleic anhydride copolymer was sandwiched by two layers 52 comprising norbornene resins. The thickness of the layer 52 of norbornene resin; the layer 54 of styrene maleic anhydride copolymer resin; and the layer 52 of norbornene resin 52 was 36 μm; 39 μm; and 38 μm. The wavelength dependencies of Re of obtained stretched films were measured using "KOBRA 21DH" made by Ohji Measurement, Co., Ltd., respectively. The results are shown in FIG. 8. From the results shown in FIG. 8, it was understood that the stretched film has a broad band ¼ wave plate with the Re being ¼ of the wavelength for the entire visible light region. Moreover, the photoelasticity ratio of the respective obtained films of laminated layers was measured using "M-150" made by Nippon Spectrogram, Co., Ltd., and found to be 3 Brewster's.

Comparative Example 7

Under the formation conditions shown in Table 1, a single layer film was prepared in a similar manner to that of Example 4 using cycloolefin based norbornene employed therein. The thickness of the obtained film was 103 μm.

The obtained single layer film was stretched 28% under the condition of 130° C., and a stretched film was obtained. The wavelength dependency of Re was measured in a similar manner to that of Example 4, and the stretched film did not exhibit the property of broad band ¼ wave plate. The results are shown in FIG. 9.

Comparative Example 8

Under the formation conditions shown in Table 1, a single layer film was prepared in a similar manner to that of Example 4 using polystyrene employed therein. The thickness of the obtained film was 101 μm.

The obtained single layer film was stretched 18% under the condition of 100° C., and a stretched film was obtained. The wavelength dependency of Re was measured in a similar manner to that of Example 4, and the stretched film did not exhibit the property of broad band ¼ wave plate. The results are shown in FIG. 9.

In the present invention, the various problems of the foregoing conventional devices can be solved, the fabrication can be carried out by simplified steps, and a retardation plate of a broad band which uniformly retards incident light in the entire visible light region, especially a broad band λ/2 plate and a broad band plate for circularly polarizing light and a reflection-type liquid crystal display device in which the luminosity of display utilizing the retardation plate has been improved can be provided. Moreover, according to the present invention, a method of fabricating a retardation plate in which a broad band retardation plate giving uniform retardation property to light incident in the entire visible region and which can be fabricated by simplified steps can be provided.

What is claimed is:

1. A retardation plate comprising
   a first layer which comprises a material including a positive intrinsic double refraction value and
   a second layer which comprises a material including a negative intrinsic double refraction value,
   with the materials of the first and second layers when laminated and stretched resulting in retardation for wavelengths of electromagnetic radiation for the plate; and
   wherein for wavelengths of 450 nm, 550 nm, and 650 nm, the plate retardation value for wavelengths of 450 nm is less than the plate retardation value for wavelengths of 550 nm, and the plate retardation value for wavelengths of 550 nm, is less than the plate retardation value for wavelengths of 650 nm; and
   wherein said first layer and said second layer each include lag axes, and are laminated to one another and stretched such that lag axes of said first layer and said second layer are substantially orthogonally crossed.

2. The retardation plate according to claim 1, further comprising
   a third layer which comprises a material including a positive or negative intrinsic double refraction value and
   wherein said layers are laminated to one another and stretched, such that signs of intrinsic double refraction values alternating from one layer to the next.

3. The retardation plate according to claim 2, wherein the materials each comprise resins, and
   each resin including a glass transition temperature, wherein the glass transition temperature of the resin comprising said third layer is at least 50° C. less the glass transition temperatures of the resins comprising the other layers.

4. The retardation plate according to claim 1, wherein the materials each comprise resins.

5. The retardation plate according to claim 1, wherein said first layer and said second layer each comprise a resin, the resin of one film including a positive intrinsic double refraction value and the resin of the other film including a negative intrinsic double refraction value.

6. The retardation plate according to claim 1, wherein the material including a positive intrinsic double refraction value, comprises a norbornene based polymer.

7. The retardation plate according to claim 1, wherein the material including a negative intrinsic double refraction value, comprises a polystyrene or a polystyrene based polymer.

8. The retardation plate according to claim 7, wherein said polystyrene based polymer is a copolymer with at least one group selected from a styrene and/or styrene derivative, acrylonitrile, maleic anhydride, methylmethacrylate and butadiene.

9. The retardation plate according to claim 1, wherein
   each material retards wavelengths of electromagnetic radiation, and if the absolute value of retardation for wavelengths of 450 nm and 550 nm is defined respectively as Re(450) and Re(550) for each material, then if:
   Re(450)/Re(550) for the material including a negative intrinsic double refraction value is subtracted from Re(450)/Re(550) for the material including a positive double refraction value, the difference is at least 0.03.

10. The retardation plate according to claim 1, wherein
    each material retards wavelengths of electromagnetic radiation, and if the absolute value of retardation for wavelengths of 450 nm and 550 nm is defined respectively as Re(450) and Re(550) for each material, then if:
    (a) Re(450)/Re(550) for the material including a positive intrinsic double refraction value is greater than Re(450)/Re(550) for the material including a negative intrinsic double refraction value, then
       Re(550) for the material including a positive intrinsic double refraction value is less than Re(550) for the material including a negative intrinsic double refraction value; and if:
    (b) Re(450)/Re(550) for the material including a positive intrinsic double refraction value is less than Re(450)/Re(550) for the material including a negative intrinsic double refraction value, then:
       Re(550) for the material including a positive intrinsic double refraction value is greater than Re(550) for the material including a negative intrinsic double refraction value.

11. The retardation plate according to claim 1, wherein photoelasticity is less than 20 Brewster's.

12. The retardation plate according to claim 1, wherein the layers when laminated result in retardation values for wavelengths of λ, said retardation values defined as Re(λ), and when λ substantially equals any of 450 nm, 550 nm and 650 nm, $0.2 \leq Re(\lambda)/\lambda \leq 0.3$.

13. The retardation plate according to claim 1, wherein the layers when laminated result in retardation values for wavelengths of λ, said retardation values defined as Re(λ), and when λ substantially equals any of 450 nm, 550 nm and 650 nm, $0.45 \leq Re(\lambda)/\lambda \leq 0.6$.

14. A retardation plate comprising a first layer which comprises a material including a positive intrinsic double refraction value and a second layer which comprises a material including a negative intrinsic double refraction value, with the materials of the first and second layers when laminated and stretched resulting in retardation for wavelengths of electromagnetic radiation for the plate; and wherein for wavelengths of 450 nm, 550 nm, and 650 nm, the plate retardation value for wavelengths of 450 nm is less than the plate retardation value for wavelengths of 550 nm, and the plate retardation value for wavelengths of 550 nm, is less than the plate retardation value for wavelengths of 650 nm; and wherein said first layer and said second layer each include molecular chains comprising an alignment direction substantially the same in both the first layer and the second layer.

15. A ½ wave plate comprising a polarizing plate and a retardation plate laminated to the polarizing plate, the retardation plate including a first layer comprising a material including a positive intrinsic double refraction value, and a second layer comprising a material including a negative intrinsic double refraction value, said first layer and said second layer comprising double refraction, each layer including a lag axis with the layers laminated to one another and stretched, such that the lag axes of the first and second layers are substantially orthogonal to the each other, said retardation plate comprising retardation values for wavelengths of λ, defined as Re(λ), and for each of λ=450 nm, 550 nm and 650 nm, $0.4 \leq Re(\lambda)/\lambda \leq 0.6$, and the polarizing plate including a polarizing plate transmission axis and said retardation plate including a lag axis with said lag axis and transmission axis crossing each other.

16. The ½ wave plate according to claim 15, wherein the polarizing plate transmission axis and the lag axis cross each other at an angle not less than 30° and not greater than 60°.

17. A plate for circularly polarizing light, comprising a polarizing plate and a retardation plate laminated to the polarizing plate, the retardation plate comprising a first layer comprising a material including a positive intrinsic double refraction value and a second layer comprising a material including a negative intrinsic double refraction value, said first layer and said second layer comprising double refraction, each layer including a lag axis with the layers laminated to one another and stretched, such that the lag axes of the first and second layers are substantially orthogonal to each other, said retardation plate comprising retardation value for wavelengths of λ, defined as Re(λ), and for each of λ=450 nm, 550 nm and 650 nm, $0.2 \leq Re(\lambda)/\lambda \leq 0.3$, and the polarizing plate including a polarizing plate transmission axis and said retardation plate including a lag axis with said lag axis and the transmission axis crossing each other.

18. The plate for circularly polarizing light according to claim 17, wherein the polarizing plate transmission axis and the lag axis cross each other at an angle not less than 30° and not greater than 60°.

19. A reflection-type liquid crystal display device comprising:

(a) a reflection plate;

(b) a polarizing plate;

(c) a liquid crystal cell and a retardation plate disposed between the reflection and polarizing plates, the retardation plate including:

(i) a first layer comprising a material including a positive intrinsic double refraction value and a lag axis; and (ii) a second layer comprising a material including a negative intrinsic double refraction value and a lag axis, with the first and second layers laminated to one another and stretched, such that the lag axes of the first and second layers are substantially orthogonal to one another; and wherein the materials of the first and second layers when laminated result in retardation for wavelengths of electromagnetic radiation for the plate; and wherein for wavelengths of 450 nm, 550 nm, and 650 nm, the plate retardation value for wavelengths of 450 nm is less than the plate retardation value for wavelengths of 550 nm, and the plate retardation value for wavelengths of 550 nm, is less than the plate retardation value for wavelengths of 650 nm.

20. A method of forming a retardation plate, the method comprising the steps of:

(a) extruding a first resin comprising a positive intrinsic double refraction value to form a first plate layer;

(b) extruding a second resin comprising a negative intrinsic double refraction value to form a second plate layer;

(c) laminating the first and second plate layers to one another to form a laminate; and (d) stretching the laminate so that lag axes of the first and second plate layers become orthogonal to each other; and wherein the materials of the first and second layers when laminated result in retardation for wavelengths of electromagnetic radiation for the plate; and wherein for wavelengths of 450 nm, 550 nm, and 650 nm, the plate retardation value for wavelengths of 450 nm is less than the plate retardation value for wavelengths of 550 nm, and the plate retardation value for wavelengths of 550 nm, is less than the plate retardation value for wavelengths of 650 nm.

21. A retardation plate comprising a first layer which comprises a material including a positive intrinsic double refraction value and a second layer which comprises a material including a negative intrinsic double refraction value, wherein said first layer and said second layer each include lag axes, and are laminated to one another and stretched such that lag axes of said first layer and said second layer are substantially orthogonally crossed, wherein the layers when laminated result in retardation values for wavelengths of λ, said retardation values defined as Re(λ), and when λ substantially equals any of 450 nm, 550 nm and 650 nm, $0.2 \leq Re(\lambda)/\lambda \leq 0.3$.

22. A retardation plate comprising a first layer which comprises a material including a positive intrinsic double refraction value and a second layer which comprises a material including a negative intrinsic double refraction value, wherein said first layer and said second layer each include lag axes, and are laminated to one another and stretched, such that lag axes of said first layer and said second layer are substantially orthogonally crossed, wherein the layers when laminated result in retardation values for wavelengths of $\lambda$, said retardation values defined as $Re(\lambda)$, and when $\lambda$ substantially equals any of 450 nm, 550 nm and 650 nm, $0.45 \leq Re(\lambda)/\lambda \leq 0.6$.

* * * * *